No. 762,797. PATENTED JUNE 14, 1904.
H. J. BISHOP.
STEAM RANGE.
APPLICATION FILED JULY 8, 1903.
NO MODEL.
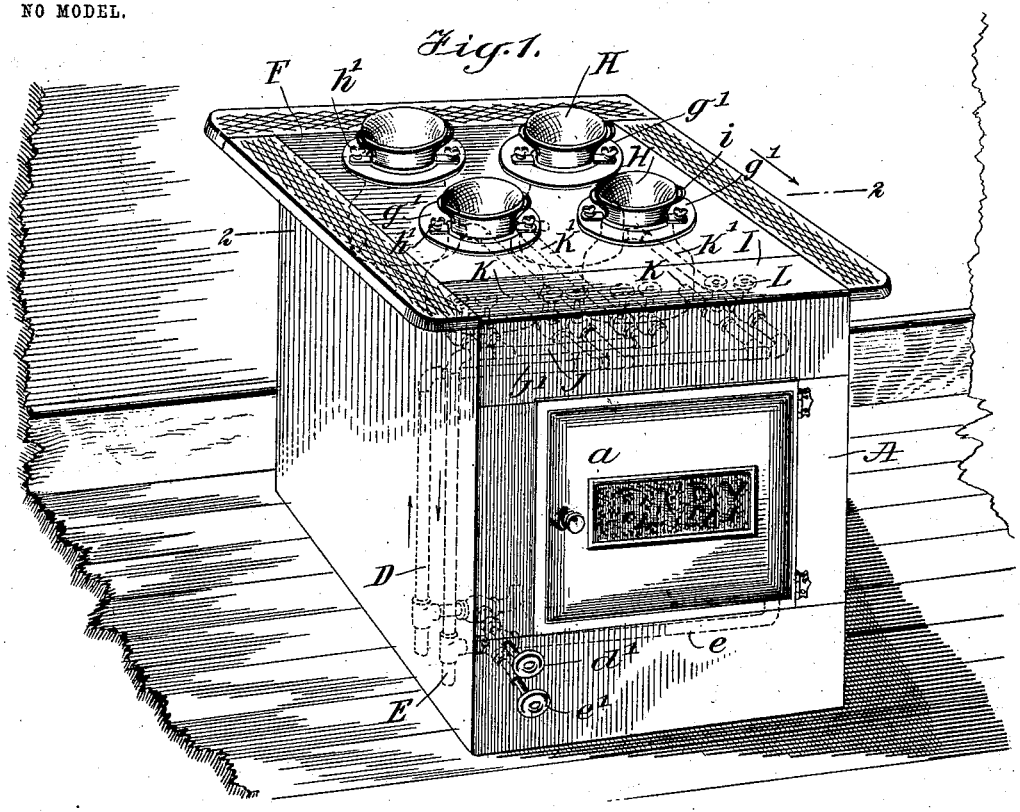
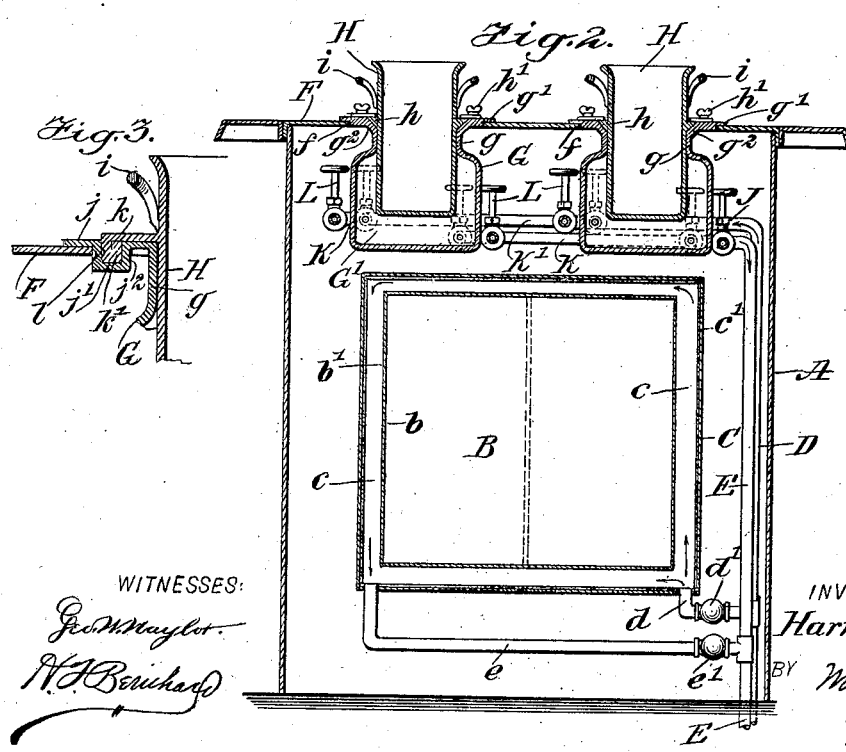
WITNESSES:
INVENTOR
Harry J. Bishop
BY
ATTORNEYS.

No. 762,797.

Patented June 14, 1904.

UNITED STATES PATENT OFFICE.

HARRY J. BISHOP, OF JERSEY CITY HEIGHTS, NEW JERSEY, ASSIGNOR OF TWO-THIRDS TO GEORGE W. YATES AND HARRY S. WOOD, OF WEST HOBOKEN, NEW JERSEY.

STEAM-RANGE.

SPECIFICATION forming part of Letters Patent No. 762,797, dated June 14, 1904.

Application filed July 8, 1903. Serial No. 164,670. (No model.)

*To all whom it may concern:*

Be it known that I, HARRY J. BISHOP, a citizen of the United States, and a resident of Jersey City Heights, in the county of Hudson and State of New Jersey, have invented a new and Improved Steam-Range, of which the following is a full, clear, and exact description.

My invention relates to improvements in steam-ranges especially designed for cooking and domestic purposes; and one object that I have in view is to produce a simple and inexpensive structure wherein provision is made for heating by steam an oven-chamber and a plurality of cooking vessels, the supply to the several parts being controllable at will.

A further object is to provide novel means for confining a removable vessel in steam-tight relation to a steam-jacket which constitutes a permanent fixture of the structure, said vessel being so disposed as to permit access to be obtained easily to the contents thereof without disturbing the relation of the vessel to the steam-jacket.

Further objects and advantages will appear in the course of the subjoined description, and the novelty will be defined by the annexed claims.

Reference is to be had to the accompanying drawings, forming a part of this specification, in which similar characters of reference indicate corresponding parts in all the views.

Figure 1 is a perspective view of a steam-range constructed in accordance with my invention. Fig. 2 is a vertical section thereof on the line 2 2 of Fig. 1, and Fig. 3 is a detail fragmentary sectional view illustrating another means for removably clamping a cooking vessel to a steam-jacket.

The body or casing A of the range is provided in its front side with an opening adapted to be closed by an oven-door $a$, the latter permitting access to be obtained easily to an oven-chamber B. These parts may be of the usual or any preferred construction, and I do not consider it necessary to more particularly describe these features. The oven-chamber is formed by a shell $b$, and said oven-chamber is enveloped by a steam-jacket C, which is arranged to form an intermediate steam-circulating space $c$ with the shell $b$ of the oven. The jacket C may be enveloped or lined with a non-conducting layer $c'$ of asbestos or other suitable material, said lining $c'$ being applied either to the inner surface of the jacket C, as shown by Fig. 2, or to the outer surface thereof. The lining $c'$ of the oven tends to confine the heat within the chamber B, and the lining or jacket $c'$ serves a like purpose with relation to the steam-jacket C.

Steam is conveyed to the range by a feed-pipe D, which is shown as extending upwardly within the body or casing A. Said steam-pipe is provided with a branch $d$, having a suitable valve or cock $d'$, said branch $d$ being coupled to the steam-jacket C at any suitable point. As shown by Fig. 2, the branch $d$ is attached to the bottom part of the steam-jacket C; but to prevent the water of condensation from flowing into the live-steam pipe D the branch $d$ may be coupled to the steam-jacket at any suitable point above the lower portion thereof. The exhaust-steam and water of condensation are conveyed away from the oven by an exit-pipe E, the same being shown as disposed in parallel relation to the pipe D and within the casing or body A. From this exit-pipe E leads a branch $e$, which is attached to the steam-jacket C for communication with the steam-space $c$, and this branch pipe is provided with a valve or cock $e'$, the latter being closed when steam is supplied to the space $c$ for the purpose of heating the oven.

The body or casing A is provided with a top plate F, the latter having a plurality of openings $f$. In Fig. 1 of the drawings I have shown the top plate as having a series of four openings; but the particular number of openings and the size of the range are not material, because the structure may be made of any suitable size to accommodate any desired number of cooking vessels.

Each opening $f$ of the top plate is occupied by a steam-jacket G, the same being suspended from the top plate F so as to lie practically in the upper part of the body or casing A. Each steam-jacket is contracted at its upper part, as at $g$, and provided with an annular flange $g'$. The contracted part $g$ of the suspended jacket serves as a seat for the reception of a cooking vessel H, while the flange $g'$ of said jacket is arranged to rest on the top plate F for the purpose of suspending the jacket in the manner described. It will be seen that the lower part of the suspended jacket G is of greater diameter than the seat part $g$ thereof, and into this enlarged lower part of the jacket is extended or projected the lower part of the cooking vessel H, the latter being preferably of uniform diameter. The vessel is provided with an external shoulder $h$, which in the form of construction represented by Fig. 2 is inclined in order to rest snugly upon an inclined face $g^2$ on the contracted part $g$ of the suspended steam-jacket, whereby the shouldered vessel may be fitted tightly to the parts $g^2$ and $g$ of the steam-jacket. The vessel is adapted to be held firmly on the seat of the steam-jacket by any suitable form of clamping devices—such, for example, as the binding-screw $h'$—and the described construction provides means for attaching the cooking vessel to the steam-jacket in a way to secure a steam-tight joint between the coöperating parts. The vessel H is provided with suitable handles $i$ for its convenient manipulation, and said vessel may be equipped with a suitable cover or top. (Not shown.)

By reference to Fig. 2 it will be seen that the lower part of the vessel H is extended into the jacket G to produce therewith a steam space or chamber $G'$, which surrounds the vessel H, at the sides and bottom thereof; but the upper part of this vessel H is extended above the jacket and the top F of the range, thus allowing ready access to be obtained to the contents of the vessel H without disturbing its relationship to the range-top and the steam-jacket.

In Fig. 3 of the drawings I have shown another means for locking the cooking vessel to the steam-jacket. In this form of construction the jacket G is provided with the contracted portion $g$, and it is formed with a wide flange $j$, the latter being disposed for engagement with the range-top F. This flange is formed with a depression $j'$, having an annular groove or channel $j^2$, the latter opening upwardly. The cooking vessel H is provided with a laterally-extending flange $k$, having at suitable points a number of depending shoulders $k'$, the latter being adapted to fit in the channel $j^2$ of said wide flange on the jacket G. One wall of the channel $j^2$ is provided with a projection or stud $l$, which is adapted to enter the groove that is formed in an opposing face of the shoulder $k'$. The vessel H is adapted to be lowered into the jacket G for engagement with the contracted portion $g$ thereof and for the flange $k$ to engage with the flange $j$, after which the vessel is turned slightly to make the projection or stud $l$ enter the groove in the dependent shoulder $k'$, which occupies the channel of the wide flange $j$. It is evident that the vessel can be easily turned in a reverse direction and lifted out of the steam-jacket, thus allowing said vessel to be readily placed in position and removed from the range without manipulating the binding-screw $h'$. If desired, a suitable packing may be employed between the jacket G and the vessel H.

The range-top F is provided at its front edge with a flap or door I, and beneath this door are arranged the horizontal branches J J' of the steam-pipes D E. The horizontal branch J of the feed-pipe D is provided with a number of other branches, K, which are connected with a series of steam-jackets G for the purpose of conveying live steam thereto, while the other branch, J', has a like number of connections K' with said series of steam-jackets for conveying the exhaust-steam therefrom. The branch pipes J J' K K' are arranged below the flap or door I of the range-top, and these branches are provided with suitable stop-cocks L, the latter being readily accessible by the operator when the door I is opened for the purpose of admitting and cutting off the supply of steam to the steam-jackets G and for allowing the exhaust-steam to escape from the jackets into the exit-pipe thereof.

My improved construction provides means whereby live steam may be admitted to a steam-jacket surrounding an oven-chamber and to a series of steam-jackets which envelop a like number of cooking vessels. The supply of steam is controlled to the oven and the cooking vessels individually by the operation of suitable valves in the branches of the steam-pipes, and it is evident that any desired number of cooking vessels may be brought into service at the same time that the oven-chamber is employed.

In the practical service of the apparatus I prefer to close the valve in the exit-pipe leading from the oven-chamber or other cooking vessel, while the valve in the feed-pipe is open to admit steam at the desired pressure to the oven or to the particular cooking vessel. When it is desired to discontinue the use of either vessel or the oven, the inlet-valve should be closed and the exhaust-valve opened, thus allowing the spent steam and water of condensation to readily escape from the oven-chamber or the suspended steam-jacket.

It is evident that one or more of the cooking vessels may be removed, and in this event the steam-jackets should be closed by separate covers. These jackets are suspended from the top plate substantially flush therewith, and when the cooking vessels are all removed another plate may be fitted on or secured to the top plate F, so as to cover the steam-jackets and form a steam-table for cooking purposes.

Having thus described my invention, I claim as new and desire to secure by Letters Patent—

1. A steam-range having a top plate provided with a plurality of openings and with a movable flap, a plurality of steam-jackets fitted individually in said openings of the jackets, valved live and exhaust steam pipes located inside of the range below the movable flaps thereof, and branch connections between said steam-pipes and the individual steam-jackets.

2. A steam-range having a top plate provided with an opening, a steam-jacket having a contracted upper portion forming an internal seat and also provided with an external flange which engages with the top plate for suspending said jacket therefrom, a cooking vessel extending downwardly into the jacket and fitted snugly in the contracted seat portion of the jacket, means for coupling the jacket and the vessel, and steam-pipes communicating with said jacket.

3. A steam-range having a steam-jacket provided with an upper contracted portion forming an internal seat, and a cooking vessel extending downwardly into the jacket and having an external flange at a point intermediate of its length, said flange being coupled to the jacket, said vessel being fitted tightly in the seat portion of the jacket and the upper portion of the vessel protruding above the jacket.

4. A steam-range comprising a casing having a top plate provided with a plurality of openings and with a movable flap, a double-walled oven-chamber within said casing, supply and return steam-pipes having branches connected to steam-spaces of the oven-chamber and other valved branches disposed below the movable flap, steam-jackets suspended from the top plate and connected individually with said valved branches of the pipes, and vessels coupled to the jackets.

In testimony whereof I have signed my name to this specification in the presence of two subscribing witnesses.

HARRY J. BISHOP.

Witnesses:
HARRY S. WOOD,
G. W. YATES.